United States Patent
Sato

(10) Patent No.: US 7,613,835 B2
(45) Date of Patent: Nov. 3, 2009

(54) GENERIC API FOR SYNCHRONIZATION

(75) Inventor: Naoyuki Sato, Campbell, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 812 days.

(21) Appl. No.: 10/658,631

(22) Filed: Sep. 8, 2003

(65) Prior Publication Data
US 2005/0055465 A1 Mar. 10, 2005

(51) Int. Cl.
*G06F 15/16* (2006.01)

(52) U.S. Cl. .................. 709/248; 709/246; 709/230; 709/250

(58) Field of Classification Search .......... 709/246, 709/248, 230
See application file for complete search history.

(56) References Cited

U.S. PATENT DOCUMENTS

| | | | | |
|---|---|---|---|---|
| 5,710,908 | A * | 1/1998 | Man | 709/230 |
| 6,189,046 | B1 * | 2/2001 | Moore et al. | 719/315 |
| 6,487,605 | B1 * | 11/2002 | Leung | 709/245 |
| 6,594,228 | B1 * | 7/2003 | Naidoo et al. | 370/217 |
| 6,614,807 | B1 * | 9/2003 | Mikkila | 370/469 |
| 6,944,185 | B2 * | 9/2005 | Patki et al. | 370/474 |
| 7,028,306 | B2 * | 4/2006 | Boloker et al. | 719/310 |
| 7,076,555 | B1 * | 7/2006 | Orman et al. | 709/227 |
| 7,149,813 | B2 * | 12/2006 | Flanagin et al. | 709/248 |
| 7,185,070 | B2 * | 2/2007 | Paul et al. | 709/220 |
| 7,197,049 | B2 * | 3/2007 | Engstrom et al. | 370/469 |
| 7,404,011 | B2 * | 7/2008 | Hansmann et al. | 709/248 |
| 2001/0034771 | A1 * | 10/2001 | Hutsch et al. | 709/217 |
| 2002/0091802 | A1 * | 7/2002 | Paul et al. | 709/220 |
| 2002/0161934 | A1 * | 10/2002 | Johnson et al. | 709/330 |
| 2002/0194388 | A1 * | 12/2002 | Boloker et al. | 709/310 |
| 2003/0014483 | A1 * | 1/2003 | Stevenson et al. | 709/203 |
| 2003/0182419 | A1 * | 9/2003 | Barr et al. | 709/224 |
| 2003/0182450 | A1 * | 9/2003 | Ong et al. | 709/246 |
| 2003/0220966 | A1 * | 11/2003 | Hepper et al. | 709/203 |
| 2003/0231741 | A1 * | 12/2003 | Rancu et al. | 379/9 |
| 2005/0228812 | A1 * | 10/2005 | Hansmann et al. | 707/102 |
| 2008/0102844 | A1 * | 5/2008 | Zhu et al. | 455/445 |

OTHER PUBLICATIONS

Ericsson et al. Jun. 15, 2001. SyncML Sync Protocol, version 1.0.1, p. 1-9, 34-47. http://www.openmobilealliance.org/tech/affiliates/syncml/syncml_protocol_v101_20010615.pdf.*

* cited by examiner

*Primary Examiner*—Kenny S Lin
*Assistant Examiner*—Hieu T Hoang
(74) *Attorney, Agent, or Firm*—Haverstock & Owens LLP

(57) ABSTRACT

A generic synchronization application programming interface (API) provides an interface between synchronization applications and a plurality of synchronization protocols. The generic synchronization API acts as an abstraction layer for the plurality of synchronization protocols. A synchronization application interfaces with the generic synchronization API in a manner independent of the specific synchronization protocol, and the generic synchronization API interfaces with each individual synchronization protocol.

16 Claims, 3 Drawing Sheets

GENERIC API FOR SYNCHRONIZATION

FIELD OF THE INVENTION

The present invention relates to the field of synchronizing data between devices. More particularly, the present invention relates to the field of providing a generic synchronization API used as an interface to applications involved in synchronizing data between devices.

BACKGROUND OF THE INVENTION

Data synchronization enables data located in different databases to be kept up-to-date, so that each data repository contains the same information. Data can include text, images, video, and other multimedia data. Data in a handheld device or laptop often requires synchronization with a desktop machine or a server. When the same data resides in multiple locations, it is often required that the data be routinely synchronized.

Synchronization applications enable devices to perform various forms of data synchronization. Synchronization applications can be used to distribute data from one device to one or more other devices, or to upload data to a device from one or more devices. As part of the data synchronization process, synchronization applications provide communications between devices which are synchronizing data. Such communications can include initialization, control commands, acknowledgments, data transfers, and other synchronization communications necessary to perform data synchronization. Various synchronization protocols exist to enable synchronization communications between data synchronizing devices. Examples of such synchronization protocols include SyncML (Synchronization Markup Language), ICE (Information and Content Exchange), and WebDAV (Web Distributed Authoring and Versioning).

SyncML synchronizes networked data with many different devices, including handheld computers such as personal digital assistants (PDAs), mobile phones, automotive computers, and desktop PCs. SyncML is a data synchronization protocol that defines workflow communication during a data synchronization session when a computing device is connected to a network or directly to another computing device. SyncML supports naming and identification of records, common protocol commands to synchronize local and network data, and supports identification and resolution of synchronization conflicts. SyncML defines the XML document type used to represent a SyncML message, such as common protocol commands and message containers. The SyncML messages are preferably transmitted using HTTP, Wireless Session Protocol (WSP), or Object Exchange protocol (OBEX).

ICE is a data sharing specification that allows one web site to obtain data from another web site. Using meta tags, ICE provides a standard way of defining a company's data. ICE is based on XML and OPS.

WebDAV provides enhancements to the HTTP protocol that turns the Web into a document database. This enables collaborative creation, editing and searching from remote locations. WebDAV enables documents to be written via HTTP (HTTP normally only supports reading). WebDAV also allows documents to be assigned properties, or attributes, that can be searched using the DAV Searching and Locating (DASL) protocol.

An API (Application Programming Interface) is a language and message format used by an application program, such as a synchronization application, to communicate with the operating system or some other control program such as a database management system (DBMS) or communications protocol, such as a synchronization protocol. APIs are implemented by writing function calls in the application program, which provide the linkage to the required subroutine for execution. Thus, an API implies that some program module is available in the computing device to perform the operation or that it must be linked into the existing program to perform the tasks.

Understanding an API is a major part of what an application programmer does. Except for writing the business logic that performs the actual data processing, most of the remaining programming includes writing the code to communicate with the operating system and other software. The APIs for operating systems can be daunting, especially the calls to display and print. For example, there are more than a thousand API calls in an operating system such as Windows, Mac or UNIX.

To perform data synchronization using a synchronization application, the synchronization application includes a separate API for interfacing with each necessary synchronization protocol. To enable a synchronization application to function in as many networking environments as possible, the synchronization application includes APIs to interface with a multitude of synchronization protocols. This greatly increases the complexity, time and cost for developing a synchronization application.

SUMMARY OF THE INVENTION

A generic synchronization application programming interface (API) provides an interface between synchronization applications and a plurality of synchronization protocols. The generic synchronization API acts as an abstraction layer for the plurality of synchronization protocols. A synchronization application interfaces with the generic synchronization API, and the generic synchronization API interfaces with each individual synchronization protocol.

Each of a first network device and a second network device includes at least one synchronization application to perform data synchronization between the two network devices. According to the preferred embodiment of the present invention, each of the first and the second network devices preferably includes a generic synchronization API to act as an abstraction layer between the synchronization applications and the synchronization protocols. When a first synchronization application on the first network device synchronizes data with the second network device, the first synchronization application formats a synchronization communication according to the generic synchronization API. The generic synchronization API then appropriately formats the synchronization communication according to one of a plurality of conventional synchronization protocols, at least one of which is sufficient for successfully providing synchronization communications with the second network device. The second network device preferably includes the generic synchronization API to receive the synchronization communication from the first network device and to format the synchronization communication according to a second synchronization application on the second network device.

In one aspect of the present invention, a first device to synchronize data with a second device includes one or more applications, a network layer coupled to interface with the second device, a synchronization layer coupled to the network layer to provide a synchronization protocol between the first device and the second device, and an interface layer coupled to communicate with the one or more applications and the synchronization layer to provide generic synchronization communications between the one or more applications and the synchronization layer. At least one of the one or more applications comprises a synchronization application. The synchronization application can be selected from a group consisting of Personal Information Manager (PIM) sync, contents distribution, and contents upload. The interface layer can be an application programming interface (API). The interface layer can be protocol independent. The synchronization layer can comprise a synchronization protocol stack. The synchronization protocol stack can be selected from a group consisting of SyncML, Information Content Exchange (ICE), and Web Distributed Authoring and Versioning (WebDAV).

In another aspect of the present invention, a network includes one or more network devices, and an application device comprising one or more applications, network layer coupled to interface with the one or more network devices, a synchronization layer coupled to the network layer to provide a synchronization protocol between the application device and the one or more network devices, and an interface layer coupled to communicate with the one or more applications and the synchronization layer to provide generic synchronization communications between the one or more applications and the synchronization layer. At least one of the one or more applications comprises a synchronization application. The synchronization application can be selected from a group consisting of Personal Information Manager (PIM) sync, contents distribution, and contents upload. The interface layer can be an application programming interface (API). The interface layer can be protocol independent. The synchronization layer can comprise a synchronization protocol stack. The synchronization protocol stack can be selected from a group consisting of SyncML, Information Content Exchange (ICE), and Web Distributed Authoring and Versioning (WebDAV).

In yet another aspect of the present invention, a method provides an interface to one or more synchronization applications resident within a first device coupled to a network of devices. The method includes sending and receiving messages to and from the one or more synchronization applications through an interface layer to one or more synchronization protocol stacks, to synchronize data between the first device and at least one other device within the network of devices, wherein the messages between the one or more synchronization applications and the interface layer are independent of a protocol used between the interface layer and the synchronization protocol stacks, and generating and receiving communications at the interface layer to complete data synchronization between the first device and the at least one other device within the network of device. The one or more synchronization applications can be selected from a group consisting of Personal Information Manager (PIM) sync, contents distribution, and contents upload. The interface layer can be an application programming interface (API). The interface layer can be protocol independent. The one or more synchronization protocol stacks can be selected from a group consisting of SyncML, Information Content Exchange (ICE), and Web Distributed Authoring and Versioning (WebDAV). Communications generated at the interface layer can be sent to a network layer via the one or more synchronization protocol stacks within the first device, and communications received at the interface layer can be received from the one or more synchronization protocol stacks via the network layer.

DETAILED DESCRIPTION OF THE EMBODIMENTS

Embodiments of the present invention includes a generic synchronization application programming interface (API) that provides an interface between synchronization applications and a plurality of synchronization protocols. The generic synchronization API acts as an abstraction layer for the plurality of synchronization protocols. A synchronization application interfaces with the generic synchronization API, and the generic synchronization API interfaces with each individual synchronization protocol. Using the generic synchronization API, an application developer can design a synchronization application which uses a single set of APIs, the generic synchronization API, instead of designing the synchronization application to include multiple sets of APIs, one set for each of the plurality of synchronization protocols. The generic synchronization API can support any number of synchronization protocols, including but not limited to SyncML, ICE (Information and Content Exchange), and WebDAV (Web Distributed Authoring and Versioning).

Figure 1:
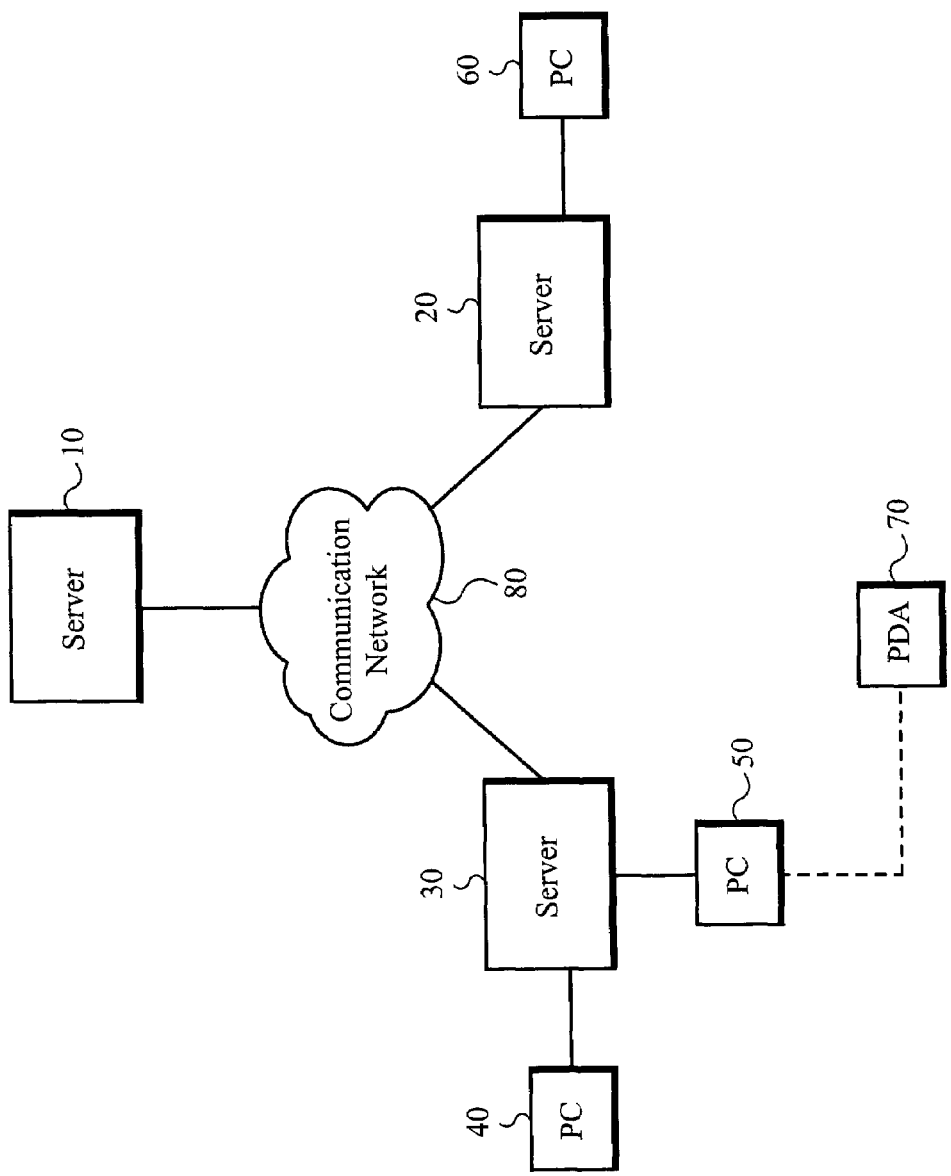
FIG. 1 illustrates an exemplary network of devices.

FIG. 1 illustrates an exemplary network of devices including a server 10, 20, and 30, a personal computer (PC) 40, 50, and 60, and a personal digital assistant (PDA) 70. The servers 10, 20, and 30 are coupled to each other via a communications network 80. The communications network 80 can be of any conventional type, or a combination thereof. Preferably, the communications network 80 is the Internet. PCs 40 and 50 are coupled to the server 30 via any conventional networking means. The PC 60 is coupled to the server 20 via any conventional networking means. The PDA 70 is coupled to the PC 50, preferably via a wireless connection, although any conventional networking means can be used. It should be clear to those skilled in the art that more or less network devices can be included in the exemplary network of devices illustrated in FIG. 1.

In the preferred embodiment of the present invention, any one or all of the network devices in FIG. 1, including the servers 10, 20, and 30, the PCs 40, 50, and 60, and the PDA 70, can include a synchronization application and the generic synchronization API according to the present invention, to enable data synchronization between network devices. Within the exemplary network of devices of FIG. 1, the PC 50 preferably includes a plurality of synchronization applications, and the generic synchronization API of the present invention. As such, the PC 50 includes an interface layer implementing the generic synchronization API according to the present invention to enable the PC 50 to use the plurality of synchronization applications according to one or more synchronization protocols. It is also understood that an interface layer implementing the generic synchronization API of the present invention can be implemented within any one or all of the other connected network devices, including the servers 10, 20, and 30, the PCs 40 and 60, and the PDA 70, to enable data synchronization between the network devices.

Figure 2:
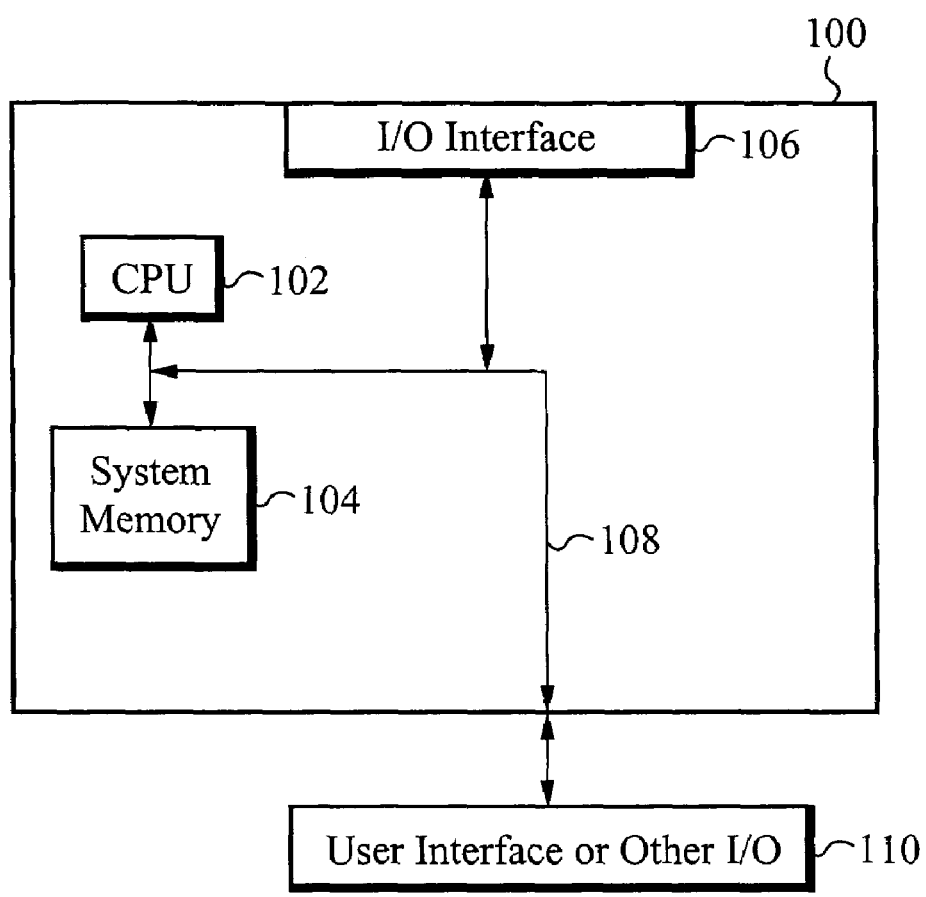
FIG. 2 illustrates a block diagram of an exemplary hardware system resident in each computing device implementing the generic synchronization API of the present invention.

A block diagram of an exemplary hardware system resident in each network device implementing the interface layer of the present invention is illustrated in FIG. 2. In the hardware system illustrated in FIG. 2, a printed circuit board 100 is coupled to a user interface 110. The printed circuit board 100 includes a central processing unit (CPU) 102 coupled to system memory 104 and to an I/O bus interface 106 by a system bus 108. The user interface 110 is also coupled to the system bus 108. The user interface 110 is network device specific, but can include a keyboard, display or other I/O devices for communicating with a user of the network device. It should be apparent to those skilled in the art that there may be some devices implementing the interface layer of the present invention which do not include the user interface 110, such as a hard disk drive or similar device.

Each network device intending to implement the interface layer of the present invention will preferably include a hardware system such as the system illustrated in FIG. 2. As applied to the network of devices illustrated in FIG. 1, the PC 50 preferably includes the hardware system of FIG. 2. The CPU 102 within the PC 50 is used to execute the appropriate program instructions. The interface layer of the present invention will then provide a simplified interface between synchronization applications resident within the PC 50 and a synchronization layer for implementing synchronization protocols used in data synchronization between network devices.

Figure 3:
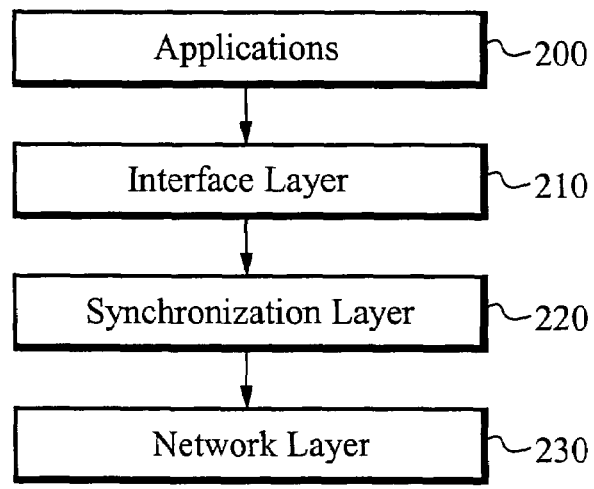
FIG. 3 illustrates a synchronization protocol.

A protocol according to the present invention is illustrated in FIG. 3. An interface layer 210 is coupled to one or more applications 200 to provide synchronization communications between the applications 200 included within the PC 50 (FIG. 1) and another network device, preferably the PDA 70 (FIG. 1). The interface layer 210 is also coupled to communicate with a synchronization layer 220. The synchronization layer 220 includes one or more synchronization protocols. The synchronization layer 220 is also coupled to a network layer 230 for generating necessary synchronization communications with the PDA 70. The network layer 230 represents a supported protocol stack used in the data synchronization process. The applications 200, the interface layer 210, the synchronization layer 220, and the network layer 230 are preferably resident within each network device implementing the generic synchronization API of the present invention. The interface layer 210 communicates with the applications 200 and the synchronization layer 220 as necessary to provide synchronization communications to and from the applications 200.

The interface layer acts as an abstraction layer such that a synchronization application can provide data synchronization communications to and receive data synchronization communications from a network device without knowing the specific type and associated synchronization protocols of the network device. The interface layer 210 preferably implements the generic synchronization API of the present invention.

Figure 4:
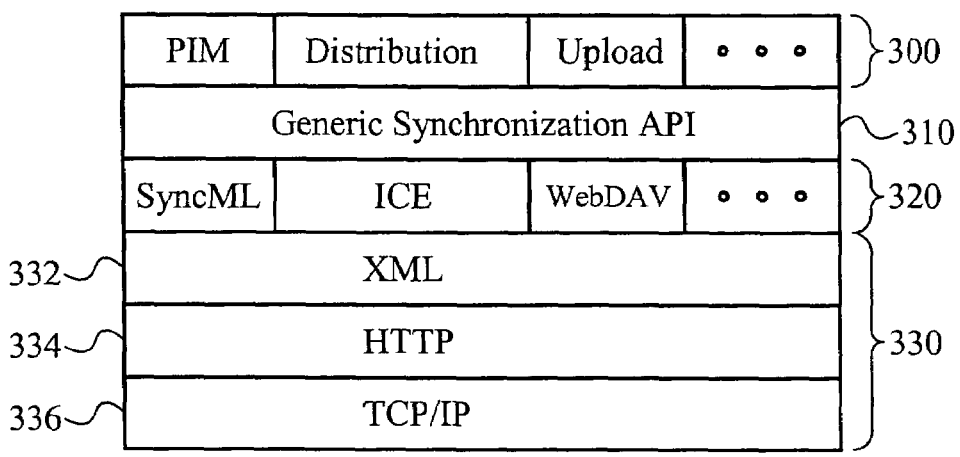
FIG. 4 illustrates a protocol according to the present invention.

FIG. 4 illustrates an exemplary protocol including multiple synchronization applications, a synchronization layer, a network layer, and the generic synchronization API of the present invention. A generic synchronization API 310 is coupled to multiple synchronization applications 300 and a synchronization layer 320. The synchronization applications 300 can include one or more synchronization applications, such as for example the Personal Information Manager (PIM) synchronization protocol, a data distribution synchronization protocol, and a data upload synchronization protocol. The synchronization layer 320 includes one or more synchronization protocols, including but not limited to SyncML, ICE, and WebDAV. A network layer protocol stack 330 acts as a network layer, and preferably includes an XML layer 332, an HTTP layer 334, and a TCP/IP layer 336. Other network layer protocols can also be used in addition to or in place of the network layer protocol stack 330 illustrated in FIG. 4. The generic synchronization API 310 acts as an abstraction layer between the synchronization applications 300 and the synchronization layer 320.

A network device uses a synchronization application to synchronize data with another network device according to a particular synchronization protocol. The synchronization application directs synchronization communications according to the generic synchronization API. The generic synchronization API appropriately formats the synchronization communications sent by the synchronization application according to the particular synchronization protocol. In this manner, a synchronization application program designer need not design the synchronization application to function with a multitude of synchronization protocols. Instead, the program designer designs the synchronization application to function with the generic synchronization API of the present invention, thereby significantly easing the application design process.

In summary, the generic synchronization API of the present invention is an abstraction layer for a synchronization application within a network device. The generic synchronization API is resident within the network device and is used by the network device to send synchronization communications to and receive synchronization communications from another network device.

In operation, a first network device and a second network device are to synchronize data. Each of the first and the second network devices includes at least one synchronization application to perform the data synchronization. In conventional data synchronization, synchronization communications between the first and second network devices are formatted according to one or more conventional synchronization protocols. Synchronization applications include communication initialization, control commands, acknowledgments, data transfers and any other communications necessary between the first and second network devices necessary to perform the data synchronization. However, according to the preferred embodiment of the present invention, each of the first and the second network devices preferably includes a generic synchronization API to act as an abstraction layer between the synchronization applications and the synchronization protocols. When a first synchronization application on the first network device synchronizes data with the second network device, the first synchronization application formats a synchronization communication according to the generic synchronization API. The generic synchronization API then appropriately formats the synchronization communication according to one of a plurality of conventional synchronization protocols, at least one of which is sufficient for successfully providing synchronization communication with the second network device. The second network device preferably includes the generic synchronization API to receive the synchronization communication from the first network device and to format the synchronization communication according to a second synchronization application on the second network device. Preferably, the first synchronization application and the second application are the same application. Alternatively, the first synchronization application is different than the second synchronization application. Since neither the first synchronization application nor the second synchronization application communicates directly using one of the plurality of conventional synchronization protocols, any synchronization protocol supported by the generic synchronization API can be used to format the synchronization communication between the generic synchronization API on the first network device and the generic synchronization API on the second network device. Synchronization communications sent from the second network device to the first network device are performed in a similar fashion.

In an alternative embodiment, the first network device includes the generic synchronization API, but the second network device does not. In this alternate embodiment, synchronization communications transmitted and received by the first network device are the same as described above. However, the second synchronization application on the second network device receives synchronization communications formatted according to one of the synchronization protocols, and the second synchronization application processes the synchronization communication formatted in the synchronization protocol. In this alternative embodiment, the generic synchronization API on the first network device must support at least one synchronization protocol supported by the second synchronization application on the second network device. The generic synchronization API formats the synchronization communication according to one of the synchronization protocols commonly supported by the second synchronization application and the generic synchronization API. In this alternative embodiment, synchronization communications sent from the second network device are formatted by the second synchronization application according to one of the plurality of synchronization protocols.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A first device to synchronize data with a second device, the first device comprising:
    a memory comprising:
    i. one or more applications;
    ii. a network layer coupled to interface with the second device;
    iii. a synchronization layer coupled to the network layer to provide a synchronization protocol between the first device and the second device; and
    iv. an application program interface (API) coupled to communicate with the one or more applications and the synchronization layer to provide synchronization between the one or more applications and the synchronization layer, wherein the API is protocol-independent, and wherein generic synchronization communications between the one or more applications and the API are independent of any synchronization protocol used between the API and the synchronization layer.

2. The first device of claim 1 wherein at least one of the one or more applications comprises a synchronization application.

3. The first device of claim 2 wherein the synchronization application is selected from a group consisting of Personal Information Manager (PIM) sync, contents distribution, and contents upload.

4. The first device of claim 1 wherein synchronization layer comprises a synchronization protocol stack.

5. The first device of claim 1 wherein the synchronization protocol stack is selected from a group consisting of SyncML, Information Content Exchange (ICE), and Web Distributed Authoring and Versioning (WebDAV).

6. A network comprising:
    a. one or more network devices; and
    b. an application device comprising:
    i. one or more applications;
    ii. a network layer coupled to interface with the one or more network devices;
    iii. a synchronization layer coupled to the network layer to provide a synchronization protocol between the application device and the one or more network devices; and
    iv. an application program interface (API) coupled to communicate with the one or more applications and the synchronization layer to provide synchronization between the one or more applications and the synchronization layer, wherein the API is protocol-independent, and wherein generic synchronization communications between the one or more applications and the API are independent of any synchronization protocol used between the API and the synchronization layer.

7. The network of claim 6 wherein at least one of the one or more applications comprises a synchronization application.

8. The network of claim 7 wherein the synchronization application is selected from a group consisting of Personal Information Manager (PIM) sync, contents distribution, and contents upload.

9. The network of claim 6 wherein synchronization layer comprises a synchronization protocol stack.

10. The network of claim 9 wherein the synchronization protocol stack is selected from a group consisting of SyncML, Information Content Exchange (ICE), and Web Distributed Authoring and Versioning (WebDAV).

11. A method of providing an application program interface (API) to one or more synchronization applications resident within a first device coupled to a network of devices, the method comprising:
    a. sending and receiving messages to and from the one or more synchronization applications through the API to one or more synchronization protocol stacks, to synchronize data between the first device and at least one other device within the network of devices, wherein the API is protocol-independent, and wherein generic synchronization communications between the one or more synchronization applications and the API are independent of a synchronization protocol used between the API and the synchronization protocol stacks; and
    b. generating and sending communications at the API to a network layer via the one or more synchronization protocol stacks within the first device; and receiving communications at the API from the network layer via the one or more synchronization protocol stacks within the at least one other device to complete data synchronization between the first device and the at least one other device within the network of devices.

12. The method of claim 11 wherein the one or more synchronization applications are selected from a group consisting of Personal Information Manager (PIM) sync, contents distribution, and contents upload.

13. The method of claim 11 wherein the one or more synchronization protocol stacks are selected from a group consisting of SyncML, Information Content Exchange (ICE), and Web Distributed Authoring and Versioning (WebDAV).

14. An apparatus for providing an application program interface (API) to one or more synchronization applications resident within a first device coupled to a network of devices, the apparatus comprising:
    a. a memory comprising:
    i. means for sending and receiving messages to and from the one or more synchronization applications through the API to one or more synchronization protocol stacks, to synchronize data between the first device and at least one other device within the network of devices, wherein the API is protocol-independent, and wherein generic synchronization communications between the one or more synchronization applications and the API are independent of a synchronization protocol used between the API and the synchronization protocol stacks; and ii. means for generating and sending communications at the API to a network layer via the one or more synchronization protocol stacks within the first device; and means for receiving communications at the API from the network layer via the one or more synchronization protocol stacks within the at least one other device to complete data synchronization between the first device and the at least one other device within the network of devices.

15. The apparatus of claim 14 wherein the synchronization application is selected from a group consisting of Personal Information Manager (PIM) sync, contents distribution, and contents upload.

16. The apparatus of claim 14 wherein the synchronization protocol stacks are selected from a group consisting of SyncML, Information Content Exchange (ICE), and Web Distributed Authoring and Versioning (WebDAV).

* * * * *

UNITED STATES PATENT AND TRADEMARK OFFICE
CERTIFICATE OF CORRECTION

PATENT NO.      : 7,613,835 B2
APPLICATION NO. : 10/658631
DATED           : November 3, 2009
INVENTOR(S)     : Naoyuki Sato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1090 days.

Signed and Sealed this

Nineteenth Day of October, 2010

David J. Kappos
*Director of the United States Patent and Trademark Office*